United States Patent Office 2,709,195
Patented May 24, 1955

2,709,195

THIOPHENE CONVERTING PROCESS

Roger A. Hines, Wilmington, Del., assignor to E. I. du Pont de Nemours and Company, Wilmington, Del., a corporation of Delaware No Drawing. Application December 31, 1953,
Serial No. 401,700

3 Claims. (Cl. 260—677)

This invention relates to a process for converting thiophene to products which are free of organic sulfur compounds and which are readily separable from benzene.

Heretofore it was known that thiophene could be converted to a series of acyclic compounds including thiols and butenes, upon reaction with metallic sodium and methanol in liquid ammonia, at ordinary liquid ammonia reaction temperature (−40° C.) (J. Chem. Soc., 1951, 2556–63; Nature, June 3, 1950, p. 889).

An object of the present invention is to provide a process for converting thiophene to products which are free of organic sulfur and which are readily separable from benzene.

It has been discovered in accord with the present invention that at temperatures in the range of 35° to 85° C. sodium metal in the presence of an alcohol (e. g. any alcohol of the formula ROH wherein R is a member of the class consisting of aliphatic and cycloaliphatic radicals free of olefinic and acetylenic unsaturation, such as methanol, cyclohexanol, etc.) converts thiophene cleanly to a C4 hydrocarbon, such as a mixture of butene-1, butene-2, and butadiene. This discovery makes possible the easy removal of thiophene from hydrocarbons in general, and from benzene in particular. The sulfur is removed as water-soluble sodium sulfide.

The invention is illustrated further by means of the following examples.

*Example 1.*—To 42 grams (0.5 mole) thiophene was added 23 grams sodium wire (1 mole) in 500 cc. round-bottomed flask equipped with addition funnel and reflux condenser with top connected to dry-ice trap to collect any gaseous products other than hydrogen. At refluxing temperature (84° C.) slow addition of 125 grams of cyclohexanol was started. Gaseous product was collected in cold trap (−80° C.) and analyzed by the mass spectrometer. The condensate had the following composition:

|  | Mole per cent |
|---|---|
| Thiophane | 0.3 |
| Butene-1 | 26.8 |
| Butene-2 | 68.7 |
| Butadiene-1,3 | 4.2 |

*Example 2.*—Powdered sodium was prepared by melting 50 grams of sodium in hot xylene, followed by stirring vigorously while cooling. The xylene was decanted and the sodium powder was washed twice with ethyl ether. To the powdered sodium (moist with ether) was added 42 g. (0.5 mole) thiophene and the mixture was heated to 84° C. in an apparatus equipped with a reflux condenser the top of which was connected to a cold trap at −80° C. To the mixture 200 g. (2.0 moles) cyclohexanol was added dropwise over five hours. After this, 200 cc. methanol was added to destroy any unreacted sodium. The mass spectograph analysis of the cold trap contents (weight 22.0 grams) was as follows:

|  | Mole per cent |
|---|---|
| Ethyl ether | 48.9 |
| Thiophane | 0.6 |
| Butene-1 | 9.0 |
| Butene-2 | 38.1 |
| Butadiene-1,3 | 0.5 |

It is to be understood that the foregoing examples are illustrative rather than limitative, and that numerous modifications of the invention are possible. Any temperature which causes the butenes to escape readily may be used (preferably temperatures should be above 35°). The process of the invention can be conducted batchwise or continuously, and any of the known methods may be used for separating the inorganic sulfur-containing product, e. g. sodium sulfide, from the hydrocarbon. Temperatures above the boiling point of thiophane may be used, but this requires superatmospheric pressure to keep thiophene liquid, unless a high boiling solvent is present. Since the reaction occurs rapidly at the boiling point of thiophene, elevated pressures, and temperatures above about 85° C., are not needed.

In the foregoing examples, the liquid products contained no organic, sulfur-containing products derived from thiophene. It is apparent therefore that the course of the reaction is altered by employing temperatures higher than those used in previously known processes, particularly temperatures of 35° to 85° C. The heating can be continued until virtually all of the thiophene has disappeared, or it may be continued until the conversion of thiophene to organic products which are sulfur-free has reached any desired level.

The invention is especially useful in the destruction of thiophene in benzene fractions which are contaminated with thiophene

I claim:

1. The method of converting thiophene to butadiene and butenes without simultaneous formation of any organic sulfur compound which comprises heating the said thiophene with metallic sodium and an alcohol of the formula ROH, wherein R is a member of the class consisting of aliphatic and cycloaliphatic monovalent hydrocarbon radicals free of olefinic and acetylenic unsaturation, at a temperature of 35° to 85° C., and continuing the heating until reaction products which are substantially free of any organic compound of sulfur are obtained.

2. The method set forth in claim 1 wherein R is methyl.

3. The method set forth in claim 1 wherein R is cyclohexyl.

References Cited in the file of this patent

Birch et al. article, Jour. of Chem. Soc. (London), 1951, pages 2556–2563.